US012807174B2

(12) United States Patent
Yokoyama

(10) Patent No.: US 12,807,174 B2
(45) Date of Patent: Nov. 24, 2026

(54) VEHICLE OPERATION SYSTEM

(71) Applicant: TOYOTA JIDOSHA KABUSHIKI KAISHA, Aichi-ken (JP)

(72) Inventor: Tomohiro Yokoyama, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 39 days.

(21) Appl. No.: 18/973,105

(22) Filed: Dec. 9, 2024

(65) Prior Publication Data

US 2025/0196876 A1 Jun. 19, 2025

(30) Foreign Application Priority Data

Dec. 18, 2023 (JP) ................................ 2023-213264

(51) Int. Cl.
*B60W 50/14* (2020.01)
*B60K 26/02* (2006.01)
*B60T 7/08* (2006.01)
*B62D 1/04* (2006.01)

(52) U.S. Cl.
CPC ............. *B60W 50/14* (2013.01); *B60K 26/02* (2013.01); *B60T 7/085* (2013.01); *B62D 1/046* (2013.01); *B60K 2026/028* (2013.01); *B60W 2050/146* (2013.01); *B60W 2540/21* (2020.02); *B60W 2540/215* (2020.02)

(58) Field of Classification Search
CPC ........... B60W 50/14; B60W 2540/215; B60W 2540/21; B60W 2050/146; B60K 26/02; B60K 2026/028; B60T 7/085; B62D 1/046
USPC ............................................................ 701/70
See application file for complete search history.

(56) References Cited

U.S. PATENT DOCUMENTS 872,478 A * 12/1907 Thum .................... B60K 26/02 477/206
1,593,876 A * 7/1926 Learmont .............. B60K 26/02 180/335
3,226,997 A * 1/1966 Malloy .................. B60K 26/02 74/532

(Continued)

FOREIGN PATENT DOCUMENTS

EP 1288887 A2 3/2003
JP 6414628 B2 10/2018
JP 2020-203602 A 12/2020

*Primary Examiner* — Kurt Philip Liethen
*Assistant Examiner* — John D Bailey
(74) *Attorney, Agent, or Firm* — HAUPTMAN HAM, LLP

(57) ABSTRACT

A vehicle operation system, including: a steering member to be gripped by a hand of a driver of a vehicle for a steering operation; an operation member for at least one of a brake operation and an accelerator operation, the operation member being provided on the steering member so as to be operable by the driver's hand; a detection device configured to detect an operation amount of the operation member; and a computer configured to receive a detection result of the detection device; wherein the computer is configured to calculate a control characteristic that represents a relationship between the operation amount of the operation member and target deceleration or target acceleration, which is a control target value, based on the detection result of the detection device acquired in a situation in which a predetermined condition including a condition that a stop state of the vehicle is maintained is satisfied.

16 Claims, 5 Drawing Sheets

(56) References Cited

U.S. PATENT DOCUMENTS 4,946,013 A * 8/1990 Conlyn, Jr. ........... B60W 30/18
477/209
5,031,729 A * 7/1991 Wittkop .................... B60T 7/02
74/532
5,947,227 A * 9/1999 Kempf .................. B60W 30/18
180/335
6,131,712 A * 10/2000 Rhodenizer ........... B60T 17/223
188/352
6,435,055 B1 * 8/2002 Sato ......................... G05G 9/02
74/562.5
7,806,224 B2 * 10/2010 Maeda ................... B62D 1/181
74/495
8,366,547 B2 * 2/2013 Haswell ................ A63F 13/211
463/6
8,915,342 B2 * 12/2014 Cook ..................... B60K 20/06
74/473.31
9,002,597 B2 * 4/2015 Sata ....................... B60K 20/06
701/52
9,393,867 B2 * 7/2016 Downey .................. G05G 1/04
10,543,843 B2 * 1/2020 Miwa ..................... B60K 26/02
11,433,921 B2 * 9/2022 Hara ..................... B60W 10/18
11,755,054 B2 * 9/2023 Yamamoto ............... G05G 5/05
74/471 R
11,897,537 B2 * 2/2024 Yamamoto ............. B60K 26/04
12,319,141 B2 * 6/2025 Morita ................... B60K 28/06
12,420,818 B2 * 9/2025 Tochigi ................. B60W 30/16
2004/0108161 A1 * 6/2004 Ohno .................... B60W 10/06
180/315
2004/0143379 A1 * 7/2004 Borroni-Bird ......... B60K 35/10
701/36
2015/0321667 A1 * 11/2015 Fukata .................. B60W 30/06
701/70
2016/0039409 A1 * 2/2016 Hayakawa ........... G06V 20/586
701/70
2018/0111671 A1 * 4/2018 Shibayama ............ B63H 11/02
2018/0251203 A1 * 9/2018 Shibayama ............ B63H 25/02
2022/0126878 A1 * 4/2022 Moustafa .......... B60W 60/0013
2022/0234644 A1 * 7/2022 Yamamoto ................ A61F 4/00
2023/0192135 A1 * 6/2023 Tanaka .................. B60W 30/18
701/23
2023/0311952 A1 * 10/2023 Kikuchi ............ B60W 60/0053
701/23
2023/0371423 A1 * 11/2023 Iida ........................... B60T 7/06
2024/0025465 A1 * 1/2024 Morita ..................... G05G 1/01

* cited by examiner

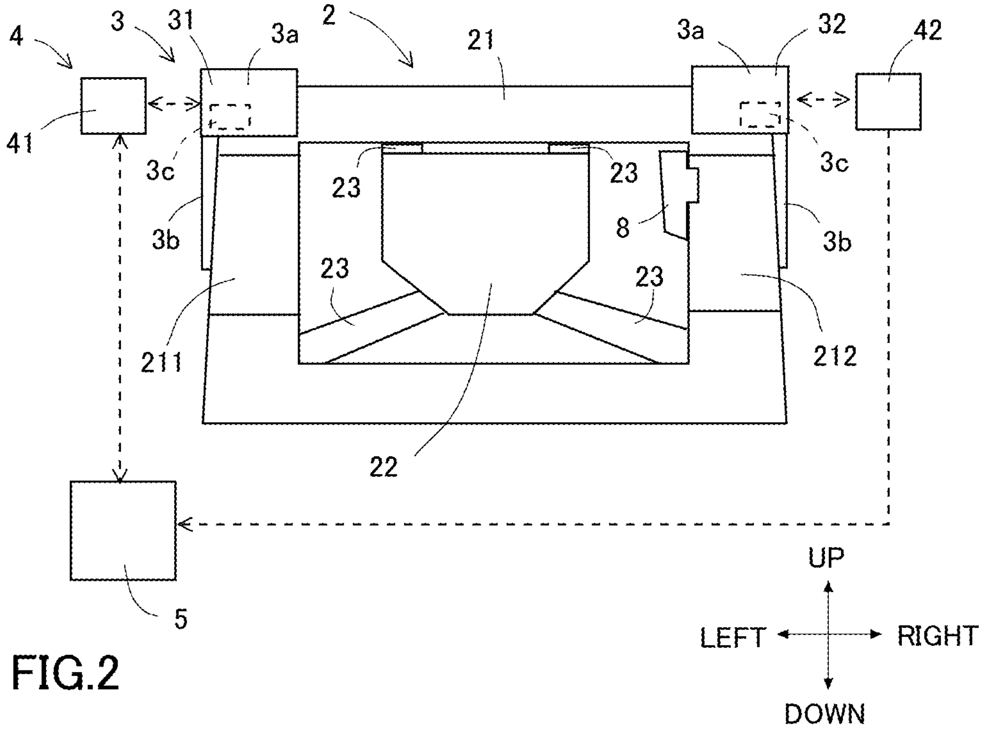
FIG.2
FIG.3
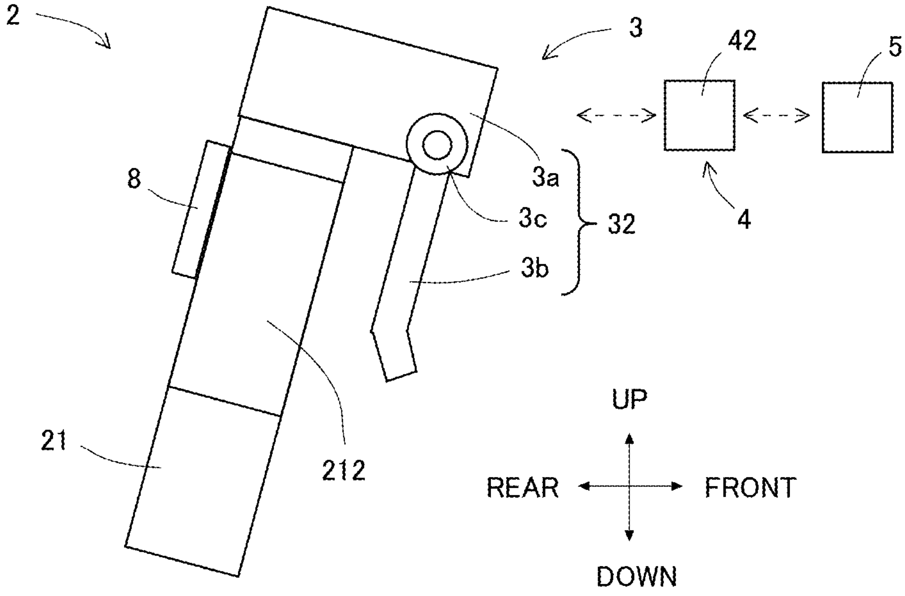

VEHICLE OPERATION SYSTEM

REFERENCE TO RELATED APPLICATION

This application claims priority from Japanese Patent Application No. 2023-213264 filed on Dec. 18, 2023. The entire content of the priority application is incorporated herein by reference.

TECHNICAL FIELD

The following disclosure relates to a vehicle operation system.

BACKGROUND ART

A system in which an accelerator operation member and a brake operation member are provided on a steering member has been recently developed. In such a system, an operation system provided at a driver's foot is concentrated on the steering member at a driver's hand, and a driver can accelerate and decelerate the vehicle without a pedal operation by the foot. For example, Japanese Patent Application Publication No. 2020-203602 (JP 2020-203602 A) discloses a steering member including an operation portion for operating acceleration and deceleration of a vehicle provided in the vicinity of a steering grip portion.

SUMMARY

A maximum stroke of an operation member such as a lever operated by a hand gripping a steering member tends to be smaller than a maximum stroke of a pedal operated by a foot, in terms of arrangement. For example, the maximum stroke of the brake operation member disposed on the steering member may be about ⅓ of the maximum stroke of the brake pedal disposed at the foot. As a result, an adjustment of acceleration and deceleration by the hand gripping the steering member tends to be more sensitive and difficult than an adjustment of the acceleration and deceleration by the foot. In a configuration in which the operation member is provided on the steering member, a control characteristic that represents a relationship between an operation amount (stroke) of the operation member and a control target value greatly affects an operation feeling of a driver. In addition, it is considered that a manual operation is likely to differ depending on driver's characters (such as grip strength and dexterity). In the operation member configured to be operated by the hand gripping the steering member, improvement in operability of the operation member (improvement in the driver's operation feeling) is an issue.

Accordingly, an aspect of the present disclosure relates to a vehicle operation system capable of improving operability of an operation member related to acceleration and deceleration in a configuration in which the operation member is provided on a steering member. In one aspect of the present disclosure, a vehicle operation system includes: a steering member to be gripped by a hand of a driver of a vehicle for a steering operation; an operation member for a brake operation and/or an accelerator operation provided on the steering member so as to be operable by the hand of the driver, a detection device configured to detect an operation amount of the operation member, and a computer configured to receive a detection result of the detection device. The computer is configured to calculate a control characteristic that represents a relationship between the operation amount of the operation member and target deceleration or target acceleration, which is a control target value, based on the detection result of the detection device acquired in a situation in which a predetermined condition including a condition that a stop state of the vehicle is maintained is satisfied.

According to present disclosure, the control characteristic related to acceleration or deceleration is set based on the operation amount of the operation member detected in the situation in which the predetermined condition is satisfied. That is, according to the present disclosure, it is possible to set the control characteristic suitable for driver's characters (such as grip strength and dexterity). The configuration according to the present disclosure enables different control characteristics to be set between a case where a driver with relatively weak hand strength operates the operation member and a case where the driver with relatively strong hand strength operates the operation member, for example. That is, according to the present disclosure, the operability of the operation member can be improved by setting the control characteristic suitably depending on drivers.

BRIEF DESCRIPTION OF DRAWINGS

The objects, features, advantages, and technical and industrial significance of the present disclosure will be better understood by reading the following detailed description of an embodiment, when considered in connection with the accompanying drawings, in which:

FIG. 2 is a conceptual front view of a steering member according to the embodiment;

FIG. 3 is a conceptual side view of the steering member according to the embodiment;

DESCRIPTION

Figure 1:
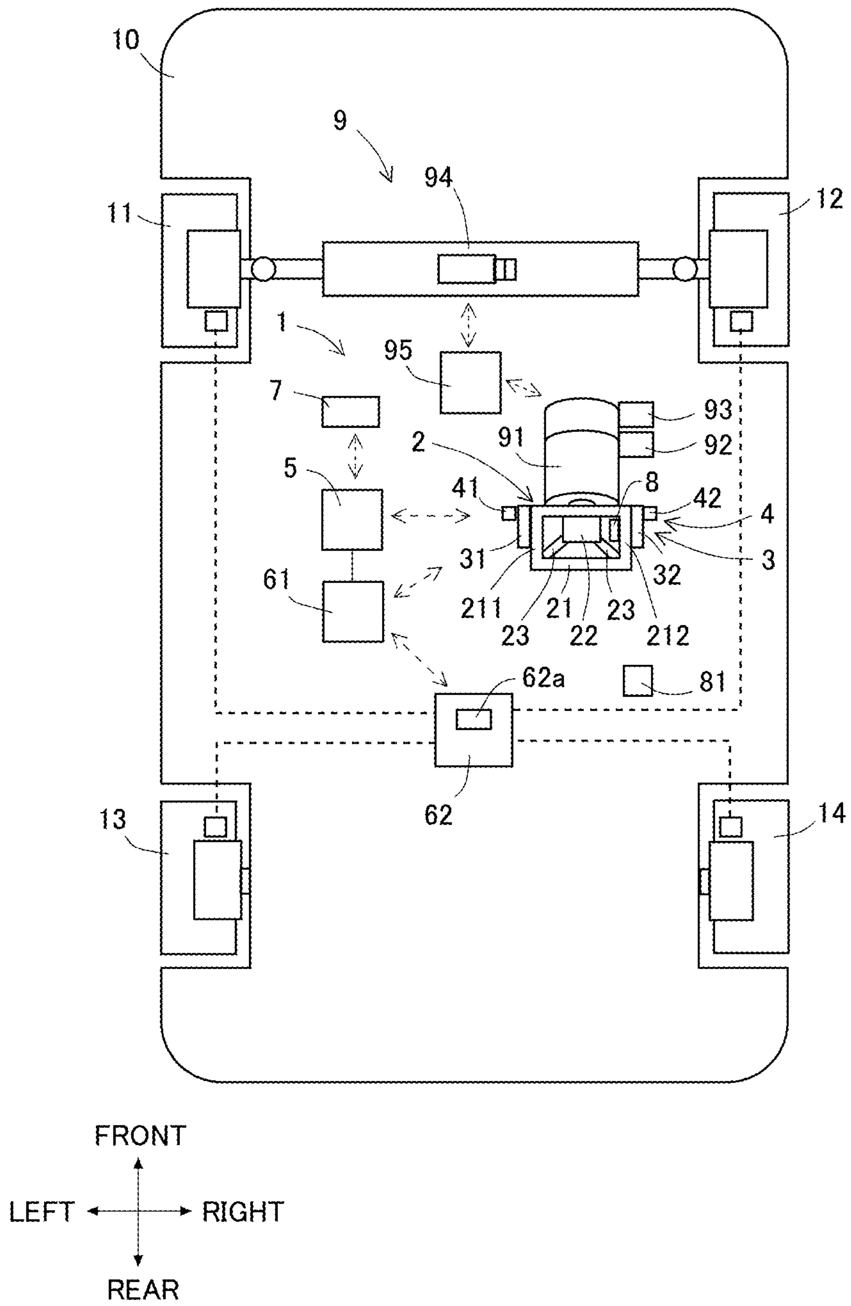
FIG. 1 is a view illustrating a configuration of a vehicle operation system according to an embodiment of the present disclosure.

Referring to the drawings, there will be hereinafter described in detail a vehicle operation system 1 according to one embodiment of the present disclosure. In a vehicle 10 of the present embodiment, a steer-by-wire system is employed for steering, and a brake-by-wire system is employed for braking. It is to be understood that the present disclosure is not limited to the details of the following embodiment but may be changed and modified based on the knowledge of those skilled in the art.

As shown in FIG. 1, the vehicle operation system 1 of the present embodiment includes a steering member 2, a brake operation member (corresponding to an "operation member") 3, a detection device 4, and a computer 5. The steering member 2 is an operation member to be gripped by a driver's hand for a steering operation. The steering member 2 constitutes a part of a steering device 9. The steering device 9 includes the steering member 2, a steering column 91, a reaction force applying portion 92, a sensor 93, an actuator 94, and an ECU 95.

The steering column 91 holds the steering member 2 so as to be rotatable with respect to an instrument panel reinforcement. The reaction force applying portion 92 includes an electric motor and a speed reduction mechanism. The reaction force applying portion 92 applies a reaction force with respect to the steering operation. The sensor 93 detects an operation amount of the steering member 2 and transmits the operation amount to the ECU 95. The actuator 94 is a device that steers wheels (here, front wheels 11, 12) and includes an electric motor as a drive source. The ECU 95 is an electronic control unit (also referred to as a computer) including at least one processor and at least one memory. The ECU 95 controls the electric motor of the actuator 94 based on a detection result of the sensor 93. The actuator 94 constitutes the steer-by-wire system, is mechanically independent of an operation force of the steering member 2, and steers the wheels by the force of the electric motor.

As shown in FIGS. 2 and 3, the steering member 2 of the present embodiment is formed so as to have a quadrangular shape as a whole. The steering member 2 includes a frame-shaped portion 21 having a frame-like shape, a central portion 22 disposed inside the frame of the frame-shaped portion 21, and connecting portions 23 connecting the central portion 22 and the frame-shaped portion 21. The frame-shaped portion 21 is formed so as to have a quadrangular shape (substantially quadrangular frame shape). The frame-shaped portion 21 may have a polygonal shape other than the quadrangular shape or a circular shape. Left and right portions of the frame-shaped portion 21 are grip portions 211, 212 to be gripped by a driver. The left grip portion 211 is gripped by a left hand of the driver, and the right grip portion 212 is gripped by a right hand of the driver. The steering member 2 may be a polygonal member as a whole as described above or may be a circular steering wheel. The central portion 22 is connected to the steering column 91.

The brake operation member 3 is provided on the steering member 2 so as to be operable by a driver's hand. The brake operation member 3 is for operating deceleration of the vehicle. The brake operation member 3 of the present embodiment includes two brake levers 31, 32. The brake levers 31, 32 are disposed forward of (in front of) the corresponding grip portions 211, 212 in a front-rear direction of the vehicle. Each of the brake levers 31, 32 includes a main body portion 3*a* including a rotation shaft, a lever portion 3*b* connected to the main body portion 3*a* so as to be rotatable about the rotation shaft, and a reaction force applying portion 3*c*. The main body portion 3*a* of the brake lever 31 is provided at an upper left corner portion of the frame-shaped portion 21, and the main body portion 3*a* of the brake lever 32 is provided at an upper right corner portion of the frame-shaped portion 21. Each lever portion 3*b* is a lever-shaped member and extends downward from the corresponding main body portion 3*a*.

The brake operation is performed such that the driver pulls the lever portion 3*b* toward himself/herself with fingers of his/her hand gripping the grip portion 211, 212. A control target value of the deceleration of the vehicle (hereinafter, also referred to as target deceleration) is set based on an operation amount of the brake operation, that is, a stroke of each lever portion 3*b*. The brake levers 31, 32 are configured to be independently operable. The brake operation is established by operating at least one of the brake levers 31, 32.

The reaction force applying portion 3*c* is a device for applying a reaction force to the movement of the corresponding lever portion 3*b* by the brake operation. The reaction force applying portion 3*c* includes, for example, a spring member. The reaction force applying portion 3*c* applies the reaction force to the brake operation member 3 based on a preset relationship between the stroke and the reaction force (reaction force characteristic). The reaction force applying portion 3*c* is configured to realize a predetermined reaction force characteristic. The reaction force applying portion 3*c* may include an electric motor and a speed reduction mechanism. In this case, the computer 5 controls the electric motor of the reaction force applying portion 3*c* based on the predetermined reaction force characteristic.

The steering member 2 is provided with an accelerator operation member 8 with which the driver performs an accelerator operation. The accelerator operation member 8 is formed so as to have a paddle shape and is disposed at a portion of the grip portion 212 located on one side thereof nearer to the central portion 22. The driver can perform the accelerator operation by pressing the accelerator operation member 8 with his/her thumb, for example. A detection device 81 that detects an operation amount is connected to the accelerator operation member 8.

The detection device 4 detects the operation amount (stroke) of the brake operation member 3. The detection device 4 transmits the detection result to the computer 5. The detection device 4 is constituted by stroke sensors 41, 42 provided for the respective brake levers 31, 32. Each stroke sensor 41, 42 transmits the stroke of the corresponding brake lever 31, 32 to the computer 5. Each stroke sensor 41, 42 may be provided on the body portion 3*a* of the corresponding brake lever 31, 32.

The computer 5 is an in-vehicle computer including at least one processor and at least one memory. The computer 5 receives the detection result of the detection device 4. The computer 5 can also be referred to as an ECU (electronic control unit). Communication in the vehicle is performed by, for example, CAN (car area network or controllable area network), FlexRay, Ethernet, or the like.

The computer 5 calculates a brake characteristic (corresponding to a "control characteristic") indicating a relationship between the operation amount of the brake operation member 3 and the target deceleration based on the detection result of the detection device 4 acquired in a situation in which a predetermined condition including a condition that a stop state of the vehicle is maintained is satisfied. The brake characteristic can also be referred to as an SG characteristic and can be represented by an SG diagram. The computer 5 transmits the calculated brake characteristic to a brake ECU 61. That is, the computer 5 sets the brake characteristic for the brake ECU 61. The brake ECU 61 calculates the target deceleration of the vehicle based on the set brake characteristic and the detection result of the detection device 4 to control a brake device 62 based on the target deceleration.

For example, the computer 5 and the brake ECU 61 recognize, as the stroke of the brake operation, a detection value of the detection result of one of the two stroke sensors 41, 42 which is larger than that of the detection result of the other of the two stroke sensors 41, 42. For example, when only the right brake lever 32 is operated, the computer 5 and the brake ECU 61 recognize, as the stroke, the detection result of the stroke sensor 42 corresponding to the right brake lever 32.

The brake device 62 applies a braking force to each of the wheels 11, 12, 13, 14. The brake device 62 is a known device and may include, for example, a disc brake including a caliper. The brake device 62 includes at least one electric motor 62*a* (actuator). The brake ECU 61 performs brake control including feedback control with respect to the electric motor 62*a* such that actual deceleration of the vehicle approaches the target deceleration. The electric motor 62*a* may be, for example, a drive source of an electric cylinder that generates a hydraulic pressure. Further, the brake device 62 may be configured such that positions of brake pads are controlled by, for example, the electric motor 62*a* disposed in each of the wheels 11 to 14. The brake operation member 3 and the brake device 62 are not mechanically connected to each other and thus constitute a so-called brake-by-wire system. In other words, the brake operation member 3 and the brake device 62, which constitute the brake-by-wire system, are connected by an electric wire via the brake ECU 61. The computer 5 and the brake ECU 61 may be constituted by one common computer or one common ECU.

Setup of Brake Characteristic

As described above, the computer 5 calculates the brake characteristic based on the detection result of the detection device 4 acquired in the situation in which the predetermined condition including the condition that the stop state of the vehicle is maintained is satisfied. The predetermined condition is set in the computer 5 in advance. The predetermined condition according to the present embodiment includes the condition that the stop state of the vehicle is maintained and a condition that a power supply (also referred to as ignition) of the vehicle is changed to ON from OFF. The situation in which the predetermined condition is satisfied can be said to be a situation from when the power supply of the vehicle is turned on to when the stop state of the vehicle is canceled.

A specific example of "the stop state is maintained" is that "the shift selector 7 is in a parking state". For example, the shift selector 7 is a member, such as a shift lever or a shift switch, that switches a vehicle control state such as parking (P), drive (D), and reverse (R). The parking state of the shift selector 7 is, for example, a state in which the shift lever is in a parking position (P range). It should be noted that "the stop state is maintained" means that "at least all the drive wheels are locked" or means "a state in which a vehicle speed is maintained at zero", for example.

The predetermined condition of the present embodiment further includes a condition that "the parking brake is ON". That is, the predetermined condition of the present embodiment includes the condition that the shift selector 7 is in the parking state, the condition that the parking brake is ON, and the condition that the power supply of the vehicle is changed from OFF to ON. Information on ON/OFF of the parking brake, the state of the shift selector 7 (such as the position of the shift lever), wheel speeds of the respective wheels 11-14, whether or not an occupant is seated, and the like is transmitted to the computer 5 by various sensors. When the power supply of the vehicle is turned on, the computer 5 recognizes the state of the shift selector 7 and the state of the parking brake and determines whether the current situation is the situation in which the predetermined condition is satisfied. In addition to or instead of the condition that "the power supply of the vehicle is changed from OFF to ON", the predetermined condition may include, for example, a condition that "a brake characteristic change operation is performed by the driver", a condition that "the driver is seated on a driver's seat", and the like.

For example, the computer 5 calculates the brake characteristic based on the detection result of the detection device 4 for the brake operation performed by a predetermined stroke or more in the situation in which the predetermined condition is satisfied. The driver normally turns off the parking brake and changes the shift selector 7 from the parking state in a state in which the braking force is generated by operating the brake operation member 3 to a maximum stroke. Therefore, the computer 5 can usually acquire the detection result of the detection device 4 for the brake operation of the predetermined stroke or more in the situation in which the predetermined condition is satisfied. Hereinafter, a state in which the shift selector 7 is in the parking state and the parking brake is ON is referred to as a stop maintaining state.

The computer 5 may be configured to execute a notification to prompt the driver to perform a brake operation. (This notification will also be referred to as "brake notification"). In this case, the computer 5 executes the brake notification when the vehicle is in the stop maintaining state. As the brake notification, the computer 5 can display, on a display means (not shown) disposed in the vehicle that can be visually recognized by the driver, a content prompting the brake operation by characters or images, turn on a lamp, and/or provide guidance by voice. The computer 5 may display, as the brake notification, an indication that "please operate the brake." or "please pull the brake lever" on the screen, for example. The predetermined condition may include a condition that "the brake notification has been executed" instead of or in addition to the condition that "the power supply of the vehicle has been changed from OFF to ON". The brake notification is executed at a predetermined timing, for example, after the power supply of the vehicle is turned on or when the vehicle is in the stop maintaining state due to waiting for a traffic light or the like. The brake notification enables the driver to more reliably perform the brake operation.

The computer 5 calculates the relationship between the operation force and the stroke based on the detection result of the detection device 4 acquired in the situation in which the predetermined condition is satisfied. The relationship between the operation force and the stroke (hereinafter, also referred to as an FS characteristic) can be represented by an FS diagram. The FS characteristic is likely to change depending on drivers and can also be referred to as a driver characteristic.

For example, the computer 5 calculates a stroke speed from the detection result of the detection device 4 and calculates the FS characteristic based on the stroke speed. The computer 5 calculates the FS characteristic based on, for example, the stroke speed and a preset reaction force characteristic of the brake operation member 3. The stroke speed is a change amount of the stroke per unit time. The operation force is a force with which the driver operates the brake levers 31, 32 and corresponds to a depression force applied to the brake pedal. The computer 5 calculates the brake characteristic (SG characteristic) suitable for the driver according to a predetermined optimization method (optimization algorithm) based on the calculated FS characteristic. The optimization method will be described later. If the FS characteristic and the SG characteristic are determined, a relationship between the operation force and the target deceleration, i.e., an FG characteristic, is also determined.

Figure 4:
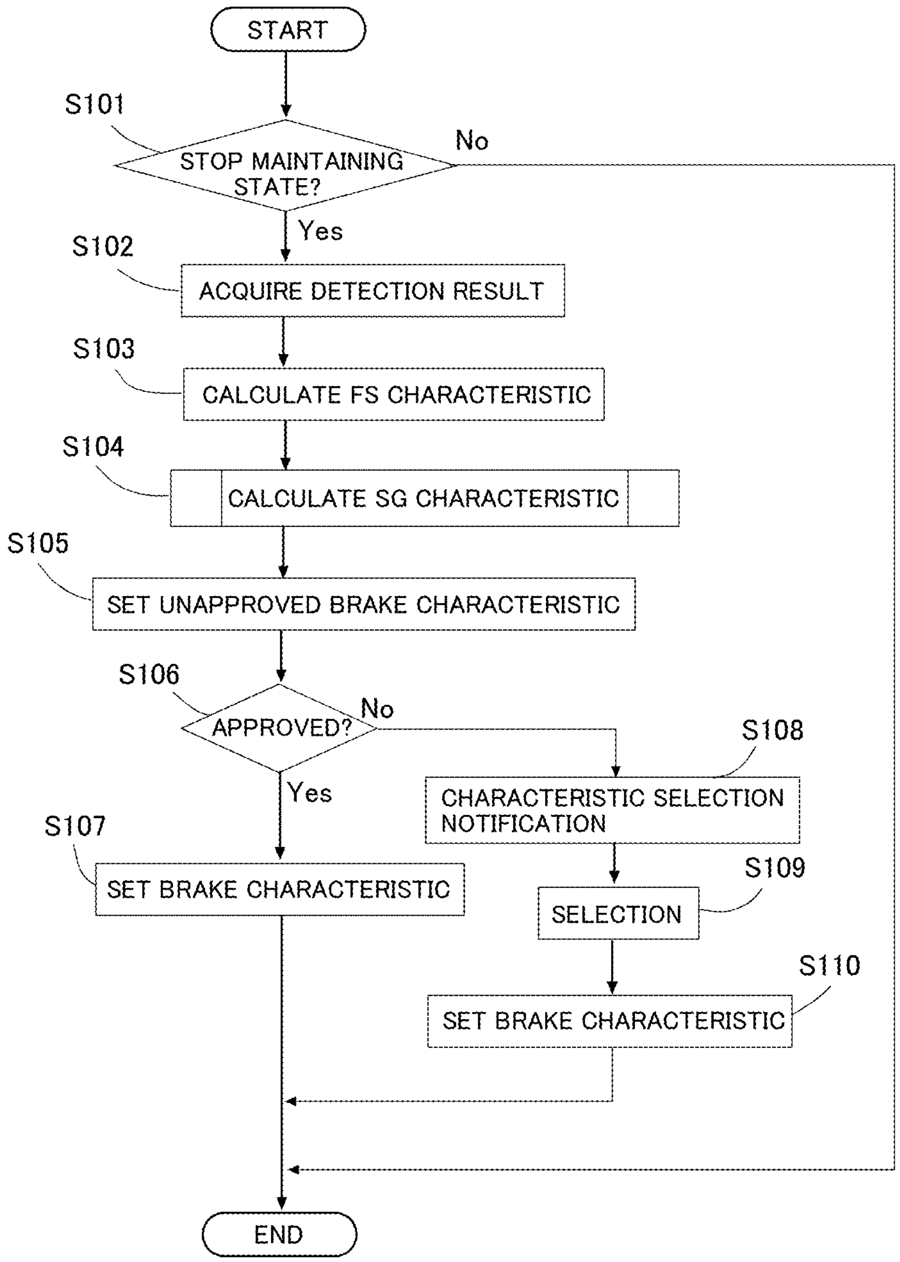
FIG. 4 is a flowchart showing an example of processing of the vehicle operation system according to the embodiment.

As one example of the processing, the computer 5 determines whether the vehicle is in the stop maintaining state after the ignition is turned on (S101), as illustrated in FIG. 4. The computer 5 of the present embodiment determines that the vehicle is in the stop maintaining state when the parking brake is ON and the shift selector 7 is in the parking state. When the vehicle stop maintaining state is canceled before the computer 5 acquires the detection result of the detection device 4 (S101: No), the predetermined brake characteristic is set, and the current setup ends.

When the vehicle is in the stop maintaining state (S101: Yes), the computer 5 determines that the predetermined condition is satisfied, executes the brake notification, and acquires the detection result of the detection device 4 (S102). The computer 5 need not necessarily execute the brake notification. The computer 5 calculates the FS characteristic of the driver based on the detection result of the detection device 4 (S103). The computer 5 executes a genetic algorithm based on the FS characteristic to calculate the SG characteristic (S104).

The computer 5 transmits the calculated SG characteristic to the brake ECU 61 as the brake characteristic (S105). That is, the computer 5 sets the brake characteristic for the brake ECU 61. This brake characteristic is a brake characteristic before being approved by the driver. Hereinafter, the brake characteristic set in step S105 is also referred to as an "unapproved brake characteristic". The brake ECU 61 sets the target deceleration based on the unapproved brake characteristic and the detection result of the detection device 4 until another brake characteristic is transmitted from the computer 5. The computer 5 executes an "approval selection notification" to inquire to the driver whether or not to approve the unapproved brake characteristic after predetermined test traveling is performed with the unapproved brake characteristic. The predetermined test traveling is set, for example, such that the vehicle travels for a predetermined period of time, by a predetermined distance, or a predetermined number of times. Like the brake notification, the approval selection notification is executed by screen display, voice, or the like. The computer 5 prompts the driver to express an intention of approval or non-approval of the unapproved brake characteristic (for example, a button operation or the like) by the approval selection notification.

The computer 5 determines whether or not the unapproved brake characteristic is approved based on, for example, an operation (a touch panel operation, a button operation, or the like) of the driver with respect to the vehicle (S106). The computer 5 determines that the unapproved brake characteristic is "approved" when an approval button is pressed and determines that the unapproved brake characteristic is "disapproved" when a disapproval button is pressed.

When the unapproved brake characteristic is approved (S106: Yes), the computer 5 stores and sets the unapproved brake characteristic as the brake characteristic corresponding to the driver (S107) and ends the setup of the brake characteristic. In this instance, the computer 5 may transmit, to the brake ECU 61, a signal indicating that the brake characteristic is approved. In this way, the computer 5 sets the brake characteristic corresponding to the current driver for the brake ECU 61 (S107). The computer 5 may store identification information of the driver (such as a name or facial recognition information) and the brake characteristic in association with each other.

When the brake characteristic is not approved (S106: No), the computer 5 presents a plurality of brake characteristics to the driver by screen display (S108), for example. The computer 5 presents a plurality of brake characteristics by cataloging (graphing) the unapproved brake characteristic such as "to slightly increase the stroke at which the deceleration rises", "to slight decrease the stroke at which the deceleration rises", "to slight reduce the inclination at which the deceleration rises", or "to slight increase the inclination at which the deceleration rises". Such presentation is referred to as "characteristic selection notification". The characteristic selection notification may present a plurality of specified brake characteristics such as "brake characteristic for powerful drivers", "brake characteristic for weak drivers", or "general brake characteristic". The brake characteristic presented by the characteristic selection notification may be simulated in advance based on ergonomics or the like. The computer 5 executes the characteristic selection notification by displaying characters, graphs, or the like on the screen, as with the approval selection notification.

When the computer 5 receives the selection result of the brake characteristic by the driver (S109), the computer 5 stores and sets the selected brake characteristic as the brake characteristic of the driver and transmits it to the brake ECU 61 (S110). That is, the computer 5 sets the brake characteristic corresponding to the current driver for the brake ECU 61 (S110). Thus, the computer 5 ends the setup of the brake characteristic.

The computer 5 is configured to be able to set up a new brake characteristic when a driver different from the driver at the time of setup is seated on the driver's seat. The computer 5 starts a setup of the brake characteristic when it recognizes a change of the driver based on, for example, a request for changing the brake characteristic (that may be referred to as "characteristic change request") such as a button operation made by the driver or a face recognition result of a camera that takes an image of the driver. That is, when the characteristic change request is made by the driver or when the brake characteristic corresponding to the driver whose image is taken by an in-vehicle camera is not stored, the computer 5 calculates the brake characteristic based on the detection result of the detection device 4 acquired in the situation in which the predetermined condition is satisfied. A re-setup can be performed by the characteristic change request even for the same driver,

Genetic Algorithm

Figure 5:
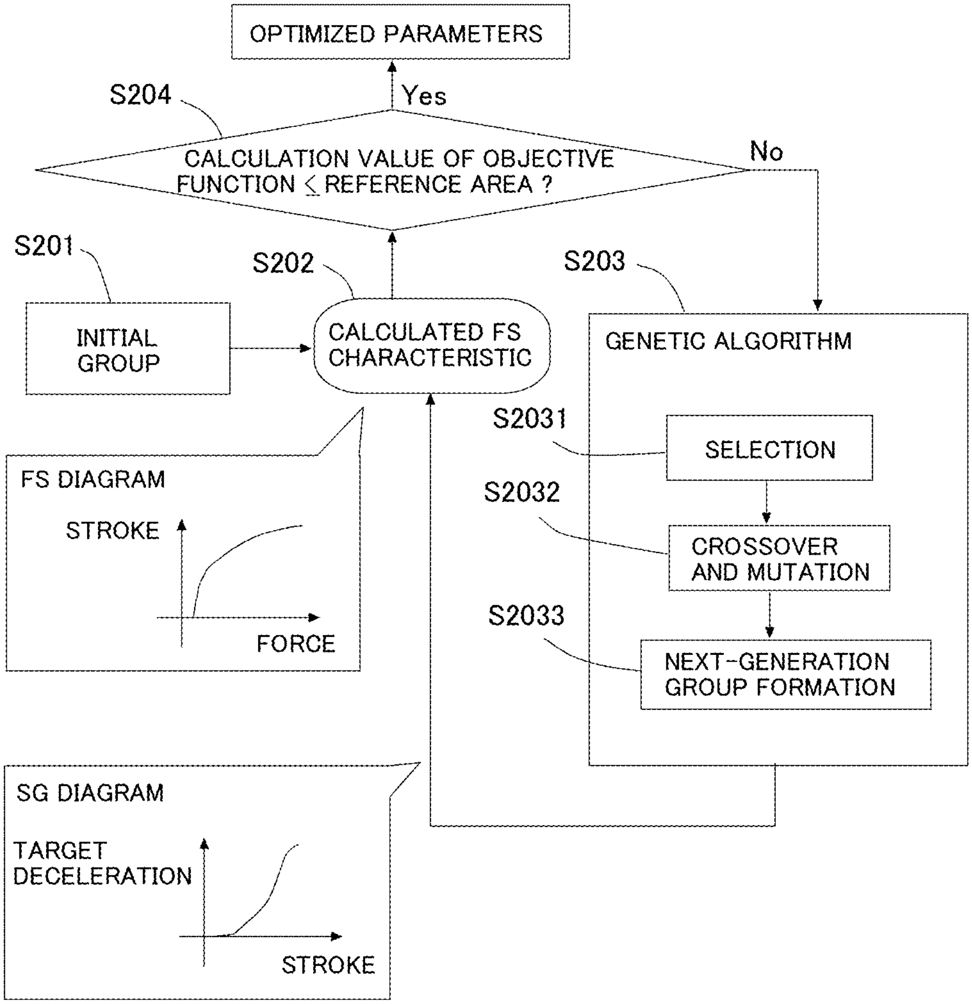
FIG. 5 is a flowchart showing a genetic algorithm according to the embodiment.

The computer 5 is configured to execute a genetic algorithm as one of the optimization methods in the calculation of the SG characteristics (S104). As shown in FIG. 5, an initial group is set for the computer 5 by a designer (S201). In other words, the designer sets expressions that generalize the SG characteristic and variable parameters as a premise for using the genetic algorithm. The expressions that generalize the SG diagram are represented by the following expressions (1) and (2):

$$G=0(S\leq b) \tag{1}$$

$$G=k(S-b)^a(b<S) \tag{2}$$

Figure 6:
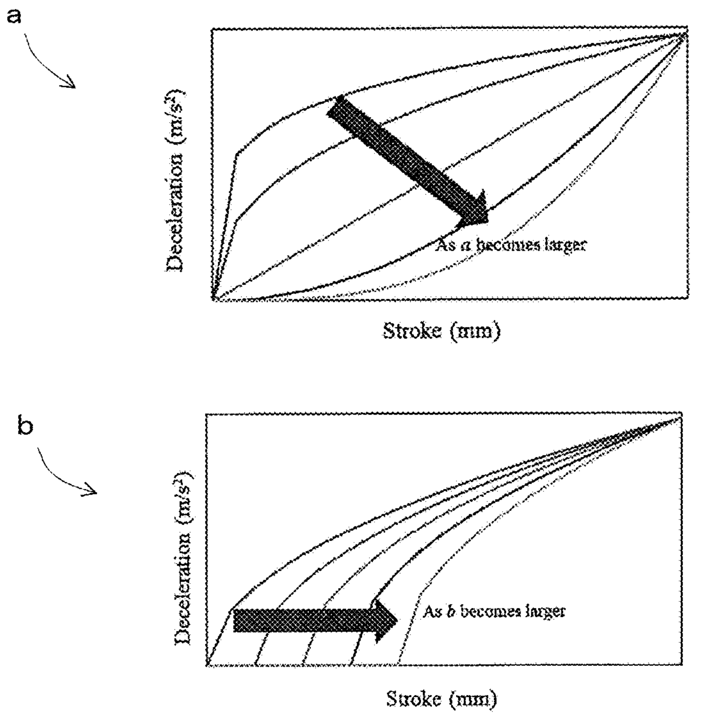
FIG. 6 indicates conceptual views each illustrating a change in an SG diagram with respect to a variable parameter according to the embodiment; and embodiment.

In the above expressions (1) and (2), "G" is target deceleration (control target value of the deceleration), "S" is a stroke (operation amount), "k" is a constant, "a" is a variable parameter that contributes to a change in the inclination of the graph, and "b" is a variable parameter that contributes to a rise of the graph. As illustrated in FIG. 6, as the value of "a" becomes larger, the SG diagram shifts to the lower right graph. As the value of "b" becomes larger, the rising position of the SG diagram shifts to the right. The variable parameter "a" contributes to a change in a degree of increase (i.e., inclination) of the target deceleration with respect to an increase in the stroke. The variable parameter "b" contributes to a minimum value of the stroke at which the target deceleration rises, in other words, the stroke at which the target deceleration is not 0.

The computer 5 inputs numerical values to the variable parameters "a" and "b" according to a rule of the genetic algorithm and sets a tentative brake characteristic (tentative SG characteristic) for calculation. In a state in which the tentative brake characteristic is set, the computer 5 simulates a temporal change in actual deceleration that is generated when the brake operation is performed by a predetermined stroke or more with the calculated FS characteristic. In other words, the computer 5 simulates a relationship between the actual deceleration that is actually generated and a time in the tentative SG characteristic and the calculated FS characteristic. The simulated temporal change of the deceleration is referred to as a "calculated deceleration characteristic". The calculated deceleration characteristic takes mechanical responsiveness and the like into consideration and can be regarded as a temporal change in the actual deceleration when the driver performs a brake operation by a predetermined stroke or more with the tentative brake characteristic. The simulation calculates how the actual deceleration changes when the target deceleration is input and can be executed by a known method.

The computer 5 stores an ideal temporal change of the deceleration in a case where the brake operation member 3 is operated by a predetermined stroke or more (hereinafter also referred to as an ideal deceleration characteristic). The ideal deceleration characteristic is a characteristic simulated in advance and is, for example, a temporal change of the deceleration expected to be comfortable for the driver based on ergonomics. The ideal deceleration characteristic may change in accordance with the calculated FS characteristic.

Figure 7:
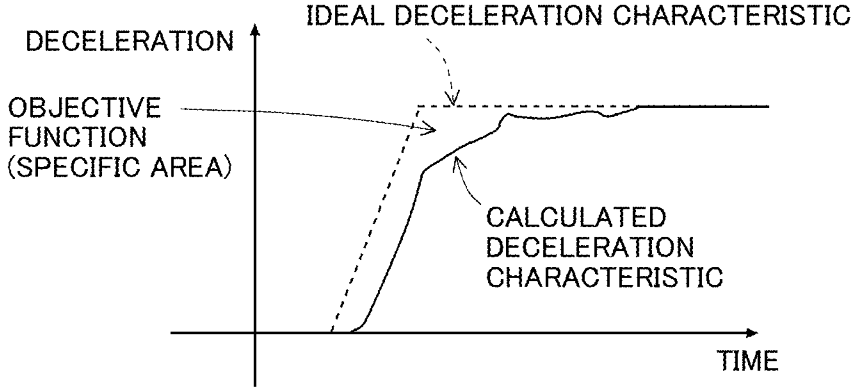
FIG. 7 is a conceptual diagram for explaining an objective function of the embodiment.

The computer 5 sets an objective function in the genetic algorithm based on the ideal deceleration characteristic. As shown in FIG. 7, the objective function is set to an area (hereinafter referred to as a specific area) surrounded by a diagram showing the ideal deceleration characteristic and a diagram showing the calculated deceleration characteristic in a two-dimensional graph in which one axis represents deceleration and the other axis represents time. It can be said that the objective function means a difference between the ideal deceleration characteristic and the calculated deceleration characteristic. The computer 5 calculates the variable parameters "a" and "b" that minimize the specific area as the objective function by the genetic algorithm (S203).

The genetic algorithm includes a selection step S2031, a crossover and mutation step S2032, and a next-generation group formation step S2033. In the genetic algorithm, a combination of the variable parameters "a" and "b" that minimizes the objective function (specific area) is searched for. As one example, in the initial selection step, N individuals (the combinations of numerical values of "a" and "b") are randomly generated as a current-generation group. In the crossover step, a part of genes (e.g., numerical sequences expressed in binary numbers) of two individuals is replaced. In the mutation step, a part of a gene of an individual is changed (inverted), for example. In this manner, the crossover step and the mutation step are performed to form a next-generation group. For example, whether to execute the mutation step is randomly determined.

The computer 5 calculates a degree of fitness of each individual of the next-generation group, that is, the calculation value (specific area) of the objective function. In the current calculation, the smaller the calculation value (specific area) of the objective function, the higher the degree of fitness. In the second and subsequent selection steps, for example, an individual having the lowest degree of fitness is deleted, and an individual having the highest degree of fitness is multiplied (copied). Further, for example, an individual having the highest degree of fitness is excluded from a target for which the next crossover step is executed. In the genetic algorithm, selection, crossover, and mutation are repeatedly performed as in the above example.

When the next-generation group is formed (S2033), the computer 5 determines whether the degree of fitness of the individual having the highest degree of fitness is not lower than a predetermined reference value (S204). In other words, the computer 5 selects a combination having the smallest specific area in the next-generation group and determines whether the specific area is not larger than a predetermined reference area (S204). When the specific area is larger than the reference area (S204: No), the computer 5 continues to execute the genetic algorithm (S203). When the specific area is equal to or smaller than the reference area (S204: YES), the computer 5 determines the individual to be an optimum solution so as to determine the variable parameters "a" and "b" (S205). In this way, the computer 5 executes the genetic algorithm until an individual having the degree of fitness higher than the reference value is calculated. The computer 5 may be set such that the computer 5 executes the genetic algorithm a predetermined number of times and determines, as the optimum solution, an individual having the highest degree of fitness in the next-generation group after the predetermined number of times.

The computer 5 inputs the variable parameters "a" and "b" calculated as the optimum solution to the expressions (1) and (2), stores the brake characteristics represented by the expressions as the unapproved brake characteristics, and transmits the unapproved brake characteristics to the brake ECU 61 (S105). The subsequent flow is the same as described above. In this way, the computer 5 executes the genetic algorithm as the optimization method. The genetic algorithm can be said to be one example of an algorithm set to obtain a solution that minimizes or maximizes the value of the objective function among solutions satisfying a constraint condition. Examples of other optimization methods include a greedy method, a dynamic programming method, and a simulated annealing method. Similarly, an accelerator characteristic can also be calculated by the optimization method.

According to the present embodiment, the brake characteristic is set based on the operation amount of the operation member detected in the situation in which the predetermined condition is satisfied. That is, according to the present embodiment, it is possible to set the brake characteristic suitable for the character of the driver (such as the operation force and the operation manner). For instance, the present embodiment enables different brake characteristics to be set between a case where a driver with a relatively weak hand force operates the brake operation member 3 and a case where a driver with a relatively strong hand force operates the brake operation member 3. That is, according to the present embodiment, the operability of the brake operation member 3 can be improved by setting the brake characteristic suitably depending on drivers.

In the present embodiment, the combination of the variable parameters "a" and "b" that minimizes the specific area (objective function) defined by the ideal deceleration characteristic is calculated by the genetic algorithm under a predetermined constraint. The predetermined constraint is set to, for example, "to execute the genetic algorithm until the calculation value of the objective function becomes equal to or less than a reference value" and/or "to execute the genetic algorithm a predetermined number of times". The variable parameters "a" and "b" corresponding to the calculation value of the objective function that is a minimum value under the predetermined constraint are calculated as the optimum solution. The brake characteristic to which the numerical values of the variable parameters "a" and "b" calculated here are input is a characteristic having a high degree of followability with respect to the ideal deceleration characteristic, and the operability of the brake operation member 3 is improved. In a case where the computer 5 calculates the accelerator characteristic, the accelerator characteristic is a characteristic having a high degree of followability with respect to the ideal acceleration characteristic, like the brake characteristic, and the operability of the accelerator operation member 8 is improved.

OTHERS

As described above, the calculation target of the computer 5 may be the accelerator characteristic. The vehicle operation system 1 includes the detection device 81 that detects an operation amount of the accelerator operation member 8. The computer 5 may calculate the accelerator characteristic that represents a relationship between the operation amount of the accelerator operation member 8 and target acceleration based on the detection result of the detection device 81 acquired in the situation in which the predetermined condition is satisfied. For example, the computer 5 may calculate the FS characteristic (relationship between an accelerator operation force and an accelerator stroke) as in the brake characteristic and calculate the SG characteristic (relationship between the accelerator stroke and the target acceleration) by a genetic algorithm using the FS characteristic. Like the genetic algorithm in the brake characteristic, the objective function may be set so as to mean a difference between ideal acceleration characteristic and the calculated acceleration characteristic. As the variable parameters of the objective function, there are set, for example, a variable "c" that contributes to a change in the inclination of the target acceleration with respect to the accelerator stroke and a variable "d" that contributes to the accelerator stroke at which the target acceleration rises. The computer 5 may calculate a combination of the variables "c" and "d" that permits the calculation value of the objective function to be equal to or less than the reference value using the genetic algorithm in the same way as described above. Thus, the computer 5 can calculate the accelerator characteristic suitably depending on drivers.

The steering device is not limited to the steer-by-wire type as described above but may be an electronic steering device that adjusts an assist force by an electric motor. For example, the steering device may be an electronic steering device (VGR) having a variable gear ratio. The brake operation member 3 and the accelerator operation member 8 may be integrally formed as one operation member. In this case, the brake operation is performed when the operation member is pulled by hand, and the accelerator operation is performed when the operation member is pushed by hand, for example. Thus, the operation member includes at least one of the brake operation member 3 and the accelerator operation member 8. Further, FS, SG, and FG can also be expressed as F-S, S-G, and F-G, respectively. The computer 5 may store a plurality of ideal deceleration characteristics corresponding to a plurality of FS characteristics. In this case, the computer 5 selects the ideal deceleration characteristic corresponding to the calculated FS characteristic. When the computer 5 includes the function of the brake ECU 61, the computer 5 calculates the brake characteristic by the genetic algorithm and controls the brake device 62 based on the calculated brake characteristic and the detection result of the detection device 4. Further, the vehicle operation system 1 is applicable to not only four-wheeled vehicles but also two-wheeled vehicles including a brake-by-wire system. Further, the FS characteristic can be calculated by a method other than the method described above, for example.

Part of Configuration of Present Disclosure (First Form) A vehicle operation system 1 incudes: a steering member 2 to be gripped by a hand of a driver of a vehicle for a steering operation; an operation member 3, 8 for a brake operation or an accelerator operation, the operation member being provided on the steering member 2 so as to be operable by the hand of the driver; a detection device 4, 81 configured to detect an operation amount of the operation member 3, 8; and a computer 5 configured to receive a detection result of the detection device 4, 81. The computer 5 is configured to calculate a control characteristic (brake characteristic or accelerator characteristic) that represents a relationship between the operation amount of the operation member 3, 8 and target deceleration or target acceleration, which is a control target value, based on the detection result of the detection device 4, 8 acquired in a situation in which a predetermined condition including a condition that a stop state of the vehicle is maintained is satisfied.

(Second Form) In the first form, the operation member includes the brake operation member 3 for the brake operation, and the computer 5 is configured to calculate the brake characteristic that represents a relationship between a stroke of the brake operation member 3 and the target deceleration based on the detection result of the detection device 4 acquired in the situation in which the predetermined condition is satisfied.

(Third Form) In the first form, the operation member includes the accelerator operation member 8 for the accelerator operation, and the computer 5 is configured to calculate the control characteristic that represents a relationship between the operation amount of the accelerator operation member 8 and the target acceleration based on the detection result of the detection device 81 acquired in the situation in which the predetermined condition is satisfied.

(Fourth Form) In one of the first through the third forms, the predetermined condition includes a condition that the shift selector 7 is in a parking state.

(Fifth Form) In the fourth form, the predetermined condition includes a condition as to a period from when a power supply of the vehicle is turned on to when the shift selector 7 is in a state other than the parking state.

(Sixth Form) In one of the first through the fifth forms, the computer 5 is configured to execute a notification (notification process) to prompt the driver to operate the operation member 3, 8 in the situation in which the predetermined condition is satisfied. For example, the computer 5 is configured to execute the brake notification that prompts the driver to perform the brake operation after the power supply of the vehicle is turned on.

(Seventh Form) In one of the first through the sixth forms, the computer 5 is configured to calculate the control characteristic using a predetermined optimization method.

(Eighth Form) In the seventh form, the computer 5 is configured to calculate the control characteristic using a genetic algorithm.

(Ninth Form) In one of the first through the eighth forms, the computer 5 is configured to: calculate an operation characteristic that represents a relationship between the operation amount of the operation member 3, 8 and an operation force of the driver based on the detection result of the detection device 4, 81 acquired in the situation in which the predetermined condition is satisfied; and execute a genetic algorithm based on the operation characteristic to calculate the control characteristic.

(Tenth Form) In the ninth form, the operation member includes the brake operation member 3, and the objective function of the genetic algorithm is set so as to mean a difference between an ideal deceleration characteristic that represents a temporal change of ideal deceleration set in advance and a calculated deceleration characteristic which is a result of simulating a temporal change of actual deceleration based on the calculated control characteristic and the calculated operation characteristic.

(Eleventh Form) In the tenth form, the objective function of the genetic algorithm includes a first variable "a" that contributes to a change in a degree of increase in the target deceleration with respect to an increase in the stroke of the brake operating member 3 and a second variable "b" that contributes to the operation amount of the brake operation member 3 at which the target deceleration rises, and the computer 5 is configured to calculate, according to the genetic algorithm under a predetermined constraint, a combination of the first variable "a" and the second variable "b" that minimizes the objective function.

(Twelfth Form) In the ninth form, the operation member includes the accelerator operation member 8, and the objective function of the genetic algorithm is set so as to mean a difference between an ideal acceleration characteristic that represents a temporal change of ideal acceleration set in advance and a calculated acceleration characteristic which is a result of simulating a temporal change of actual acceleration based on the calculated control characteristic and the calculated operation characteristic.

(Thirteenth Form) In the twelfth form, the objective function of the genetic algorithm includes a first variable "c" that contributes to a change in a degree of increase in the target acceleration with respect to an increase in the stroke of the accelerator operation member 8 and a second variable "d" that contributes to the operation amount of the accelerator operation member 8 at which the target acceleration rises, and the computer 5 is configured to calculate, according to the genetic algorithm under a predetermined constraint, a combination of the first variable "c" and the second variable "d" that minimizes the objective function.

(Fourteenth Form) In one of the first through the thirteenth forms, the computer 5 is configured to execute an approval selection notification to inquire to the driver by screen display or voice whether or not to approve the calculated control characteristic, store the control characteristic in association with the driver when the control characteristic is approved by the driver, and present one or more other control characteristic to the driver by screen display or voice when the control characteristic is disapproved by the driver.

(Fifteenth Form) In the fourteenth form, the computer 5 is configured to execute the approval selection notification after predetermined test traveling is performed in a state in which the control characteristic is set.

(Sixteenth Form) In one of the first through the fifteenth forms, when a request for changing the control characteristic is made by the driver or when the control characteristic corresponding to the driver whose image is taken by an in-vehicle camera is not stored, the computer 5 calculates the control characteristic based on the detection result of the detection device 4, 81 acquired in the situation in which the predetermined condition is satisfied.

What is claimed is:

1. A vehicle operation system, comprising:

a steering member to be gripped by a hand of a driver of a vehicle for a steering operation;

an operation member for at least one of a brake operation and an accelerator operation, the operation member being provided on the steering member so as to be operable by the hand of the driver;

a detection device configured to detect an operation amount of the operation member; and a computer configured to receive a detection result of the detection device;

wherein the computer is configured to calculate a control characteristic that represents a relationship between the operation amount of the operation member and target deceleration or target acceleration, which is a control target value, based on the detection result of the detection device acquired in a situation in which a predetermined condition including a condition that a stop state of the vehicle is maintained is satisfied, determine whether or not the calculated control characteristic is approved based on an operation of the driver, and in response to determining that the calculated control characteristic is approved by the driver, store and set the calculated control characteristic as the control characteristic corresponding to the driver.

2. The vehicle operation system according to claim 1, wherein the computer is configured to:

calculate an operation characteristic that represents a relationship between the operation amount of the operation member and an operation force of the driver based on the detection result of the detection device acquired in the situation in which the predetermined condition is satisfied; and execute a genetic algorithm based on the operation characteristic to calculate the control characteristic.

3. The vehicle operation system according to claim 2, wherein the operation member includes a brake operation member for the brake operation; and wherein an objective function of the genetic algorithm is set so as to mean a difference between an ideal deceleration characteristic that represents a temporal change of ideal deceleration set in advance and a calculated deceleration characteristic which is a result of simulating a temporal change of actual deceleration based on the calculated control characteristic and the calculated operation characteristic.

4. The vehicle operation system according to claim 3, wherein the objective function of the genetic algorithm includes a first variable that contributes to a change in a degree of increase in the target deceleration with respect to an increase in the operation amount of the brake operation member, and a second variable that contributes to the operation amount of the brake operation member at which the target deceleration rises, and wherein the computer is configured to, according to the genetic algorithm under a predetermined constraint, calculate a combination of the first variable and the second variable that minimizes the objective function.

5. The vehicle operation system according to claim 2, wherein the operation member includes an accelerator operation member for the accelerator operation, and wherein an objective function of the genetic algorithm is set so as to mean a difference between an ideal acceleration characteristic that represents a temporal change of ideal acceleration set in advance and a calculated acceleration characteristic which is a result of simulating a temporal change of actual acceleration based on the calculated control characteristic and the calculated operation characteristic.

6. The vehicle operation system according to claim 5, wherein the objective function of the genetic algorithm includes a first variable that contributes to a change in a degree of increase in the target acceleration with respect to an increase in the operation amount of the accelerator operation member, and a second variable that contributes to the operation amount of the accelerator operation member at which the target acceleration rises, and wherein the computer is configured to, according to the genetic algorithm under a predetermined constraint, calculate a combination of the first variable and the second variable that minimizes the objective function.

7. The vehicle operation system according to claim 1, wherein the computer is configured to calculate the control characteristic using a predetermined optimization method.

8. The vehicle operation system according to claim 7, wherein the computer is configured to calculate the control characteristic using a genetic algorithm.

9. The vehicle operation system according to claim 1, wherein the computer is configured to execute an approval selection notification to inquire to the driver by screen display or voice whether or not to approve the calculated control characteristic, in response to determining that the calculated control characteristic is approved by the driver, store the control characteristic in association with the driver, and in response to determining that the calculated control characteristic is disapproved by the driver, present one or more other control characteristic to the driver by screen display or voice.

10. The vehicle operation system according to claim 9, wherein the computer is configured to execute the approval selection notification after predetermined test traveling is performed in a state in which the control characteristic is set.

11. The vehicle operation system according to claim 1, wherein the operation member includes a brake operation member for the brake operation; and wherein the computer is configured to calculate the control characteristic that represents a relationship between the operation amount of the brake operation member and the target deceleration based on the detection result of the detection device acquired in the situation in which the predetermined condition is satisfied.

12. The vehicle operation system according to claim 1, wherein the operation member includes an accelerator operation member for the accelerator operation, and wherein the computer is configured to calculate the control characteristic that represents a relationship between the operation amount of the accelerator operation member and the target acceleration based on the detection result of the detection device acquired in the situation in which the predetermined condition is satisfied.

13. The vehicle operation system according to claim 1, wherein the computer is configured to, in response to (i) a request for changing the control characteristic being made by the driver or (ii) the control characteristic corresponding to the driver whose image is taken by an in-vehicle camera being not stored, calculate the control characteristic based on the detection result of the detection device acquired in the situation in which the predetermined condition is satisfied.

14. A vehicle operation system, comprising:

a steering member to be gripped by a hand of a driver of a vehicle for a steering operation;

an operation member for at least one of a brake operation and an accelerator operation, the operation member being provided on the steering member so as to be operable by the hand of the driver;

a detection device configured to detect an operation amount of the operation member; and a computer configured to receive a detection result of the detection device;

wherein the computer is configured to calculate a control characteristic that represents a relationship between the operation amount of the operation member and target deceleration or target acceleration, which is a control target value, based on the detection result of the detection device acquired in a situation in which a predetermined condition including a condition that a stop state of the vehicle is maintained is satisfied, and wherein the predetermined condition includes a condition that a shift selector is in a parking state.

15. The vehicle operation system according to claim 14, wherein the predetermined condition includes a condition as to a period from when a power supply of the vehicle is turned on to when the shift selector is in a state other than the parking state.

16. A vehicle operation system, comprising:

a steering member to be gripped by a hand of a driver of a vehicle for a steering operation;

an operation member for at least one of a brake operation and an accelerator operation, the operation member being provided on the steering member so as to be operable by the hand of the driver;

a detection device configured to detect an operation amount of the operation member; and a computer configured to receive a detection result of the detection device;

wherein the computer is configured to calculate a control characteristic that represents a relationship between the operation amount of the operation member and target deceleration or target acceleration, which is a control target value, based on the detection result of the detection device acquired in a situation in which a predetermined condition including a condition that a stop state of the vehicle is maintained is satisfied, and wherein the computer is configured to execute a notification to prompt the driver to operate the operation member in the situation in which the predetermined condition is satisfied.

* * * * *